United States Patent [19]

Gary, Jr. et al.

[11] 3,744,755
[45] July 10, 1973

[54] GLASS BALL VALVE

[75] Inventors: Rex I. Gary, Jr., Swarthmore, Pa.;
Charles Alden Kille, Vineland, N.J.

[73] Assignee: Glastron, Inc., Vineland, N.J.

[22] Filed: Apr. 27, 1972

[21] Appl. No.: 248,036

[52] U.S. Cl. ............................... 251/309, 251/315
[51] Int. Cl. ......................... F16k 5/02, F16k 5/06
[58] Field of Search ........................... 251/309, 315; 137/454.5, 454.6

[56] References Cited
UNITED STATES PATENTS

| | | | |
|---|---|---|---|
| 2,889,133 | 6/1959 | Blomstran et al. | 251/164 |
| 3,154,094 | 10/1964 | Bredtschmender et al. | 251/315 X |
| 3,195,857 | 7/1965 | Shafer | 251/315 X |
| 3,334,650 | 8/1967 | Lowrey et al. | 251/315 X |
| 3,503,415 | 3/1970 | Angelis et al. | 251/315 X |
| 3,547,403 | 12/1970 | Grauer | 251/309 X |
| 3,584,833 | 6/1971 | Grenier | 251/315 |
| 3,588,042 | 6/1971 | Yopp | 251/315 |
| 3,703,910 | 11/1927 | Smith | 251/309 X |

*Primary Examiner*—Samuel Scott
*Attorney*—John F. A. Earley

[57] ABSTRACT

A glass ball valve comprising a glass body member having a cylindrical sidewall forming a passageway, a cylindrical glass bonnet extending from the cylindrical sidewall of the body member, a pair of mounting rings forming a seat with one positioned inside the body member at each end thereof, a glass valve ball seated in said pair of mounting rings and having a fluid passageway therethrough, a stem positioned in said bonnet, said stem having a flat keying end which keys into a slot in the ball so that rotation of the stem causes rotation of the ball, a pair of end flanges with one positioned at each end of the body member, bolts connecting the end flanges together and exerting pressure on the mounting rings and the ball, a coupling insert positioned around said bonnet and having an upwardly facing end, an outwardly extending lip or bead formed on the upper end of the bonnet which acts as a stop to limit upward movement of said coupling insert, a resilient split ring positioned between the coupling insert and the bonnet and having an upwardly and outwardly flaring flange which is positioned between said upwardly facing end of the coupling insert and said lip of the bonnet, a coupling cap positioned around said coupling insert, threads connecting the coupling cap to the coupling insert for moving them toward and away from each other, a collar formed on said stem with an upwardly facing shoulder and a downwardly facing shoulder, an upwardly facing shoulder formed inside the bonnet for limiting the downward movement of said downwardly facing stem shoulder, a downwardly facing shoulder formed in the coupling cap, said upwardly facing stem shoulder limiting the downward movement of said coupling cap shoulder, an upper resilient ring of Teflon or the like seated between said upwardly facing stem shoulder and said downwardly facing coupling cap shoulder, and a lower resilient ring of Teflon or the like seated between said downwardly facing stem shoulder and said upwardly facing bonnet shoulder for sealing between said stem and bonnet.

4 Claims, 3 Drawing Figures

United States Patent [19]
Gary, Jr. et al.
[11] 3,744,755
[45] July 10, 1973
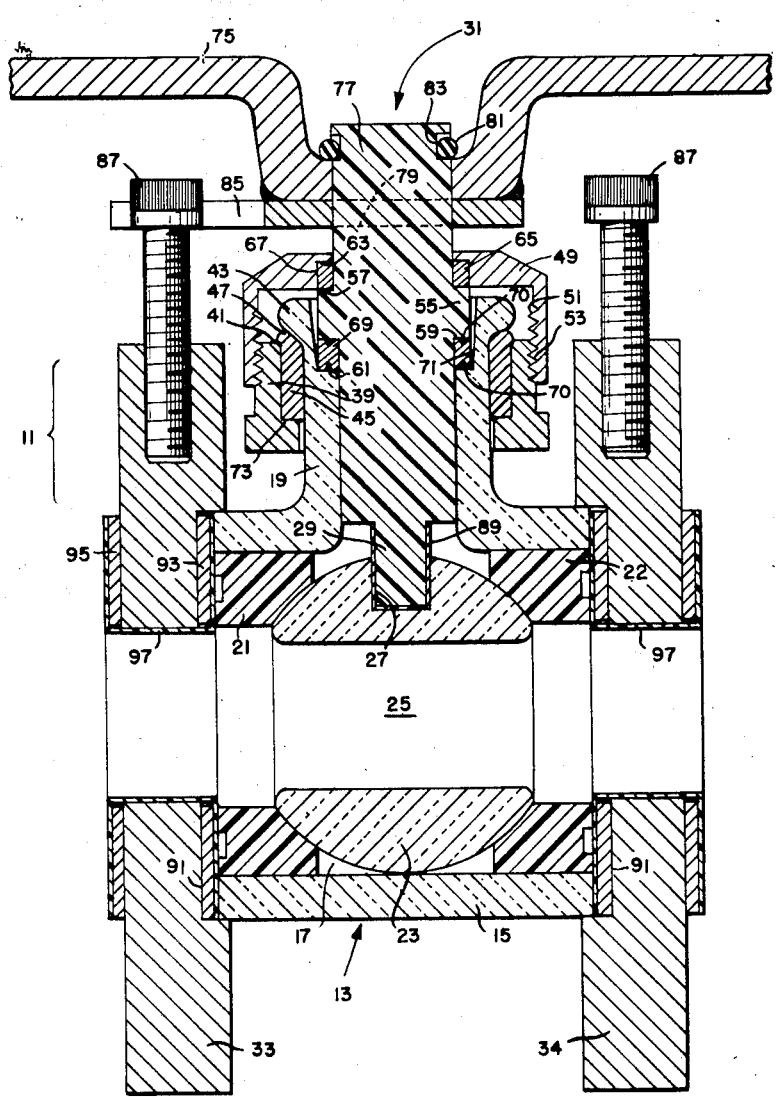

GLASS BALL VALVE

BACKGROUND OF THE INVENTION

This invention relates to ball valves, and more particularly concerns ball valves made of glass through which the fluid flowing through the valve is visible. Glass ball valves are made of inert materials which do not contaminate the fluid flowing through the valve, which may be corrosive chemicals, and are not corroded by these chemicals. For example, the body member and neck or housing extending therefrom and the ball are made of borosilicate glass, the stem is made of ceramic alumina, and the sealing rings or gaskets are made of polytetrafluoroethylene (TFE). TFE resins currently available commercially are Teflon TFE by DuPont and Halon TFE by Allied Chemical Corp. Such glass ball valves do not require a lubricant, such as Vaseline, and therefore do not contaminate the fluid chemicals passing through the valve.

Glass ball valves are currently available and are illustrated by U.S. Pat. Nos. 3,503,415 and 3,547,403. However, the glass ball valves disclosed in those patents include a yoke which presses the valve stem downwardly into sealing engagement with the inside of the bonnet or neck of the valve. If the yoke is misaligned, the valve ball may chip or break in service.

SUMMARY OF THE INVENTION

It is an object of this invention to provide a glass ball valve which does not require a lubricant, such as Vaseline, which does not contaminate the fluid, such as chemicals, which flow through the valve. It is another object to provide a glass ball valve which is easy to assemble and to align its parts so that there is no danger of the parts being misaligned and causing chipping or breaking of the valve ball.

It is another object to provide a glass ball valve which is relatively inexpensive, safe, dependable, easily operated, quickly and easily installed, highly resistant to thermal shock, long lasting, and adapted for operation by pneumatic or electric actuators.

The objects of the invention are accomplished by providing a glass ball valve that includes a bead or lip extending outwardly from the top of the bonnet, a coupling insert positioned around the bonnet and having an upwardly facing end, a coupling cap positioned around said coupling insert, shoulder formed connecting the coupling cap to the coupling insert for moving them toward and away from each other, a resilient split ring positioned between the coupling insert and the bonnet and having an upwardly and outwardly flaring flange which is positioned between the upwardly facing end of the coupling insert and the lip of the bonnet, a valve stem with a collar formed on the stem, said collar having an upwardly facing shoulder and a downwardly facing shoulder, an upwardly facing shoulder formed inside the bonnet for limiting the downward movement of the downwardly facing stem shoulder, a downwardly facing shouldeformed in the coupling cap, the upwardly facing stem shoulder limiting the downward movement of the coupling cap shoulder, an upper resilient ring of Teflon or the like seated between the upwardly facing stem shoulder and the downwardly facing cap shoulder, and a lower resilient ring of Teflon or the like seated between the downwardly facing stem shoulder and the upwardly facing bonnet shoulder for sealing the valve between the stem and the bonnet when the coupling cap is threaded onto the coupling insert.

DESCRIPTION OF THE PREFERRED EMBODIMENT

Figure 1:
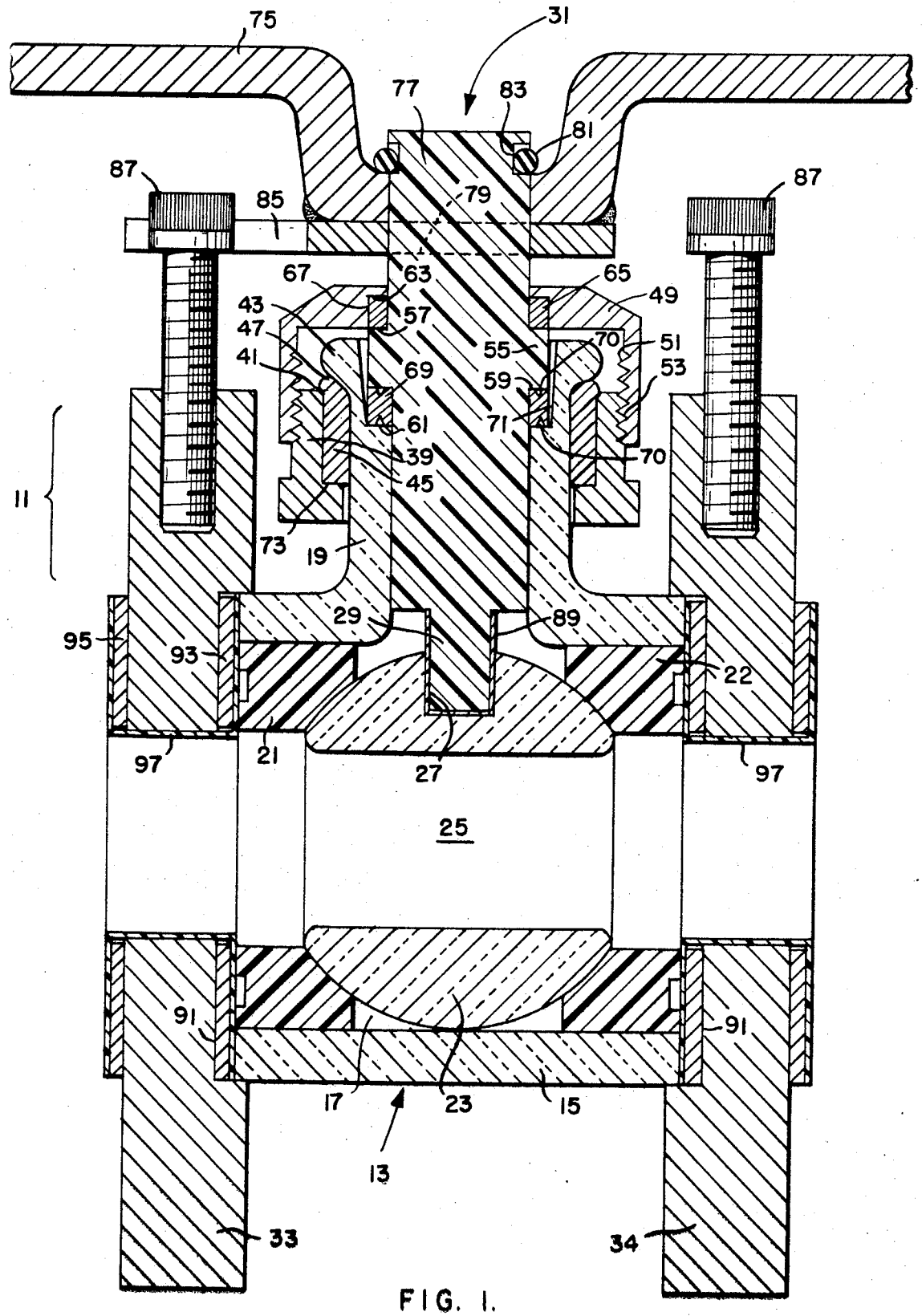
FIG. 1 is a view in vertical section of a glass ball valve constructed in accordance with this invention.
Figure 2:
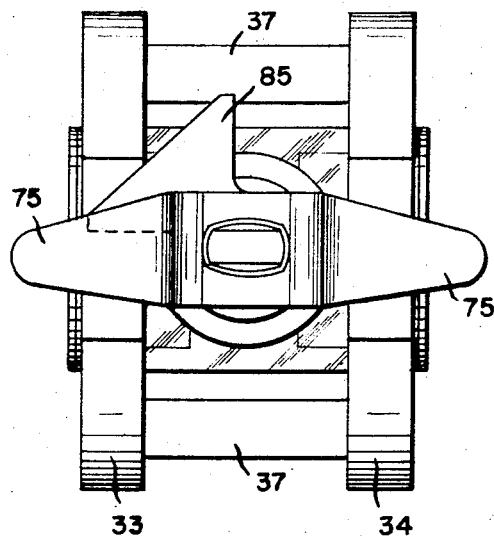
FIG. 2 is a view in top plan of the glass ball valve of FIG. 1.
Figure 3:
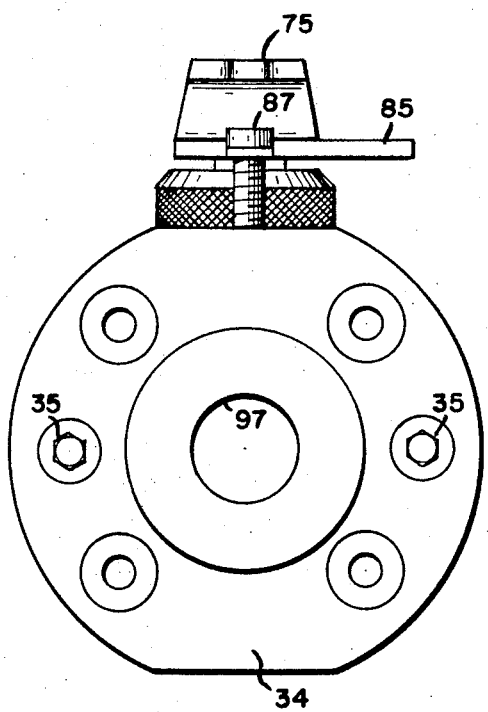
FIG. 3 is a view in side elevation of the glass ball valve of FIG. 1.

Turning now to the specific embodiment of the invention selected for illustration in the drawings, there is shown a glass ball valve 11 which comprises a glass body member 13 having a cylindrical sidewall 15 forming a passageway 17. A cylindrical glass bonnet or neck 19 extends from sidewall 15 of body member 13, and a pair of resilient mounting rings 21, 22 form a seat with ring 21 positioned inside body member 13 at one end and ring 22 positioned inside body member 13 at the other end. A glass valve ball 23, which is highly polished to close tolerances, is seated in the pair of mounting rings 21, 22 and has a fluid passageway 25 extending therethrough. Glass ball is also provided with a keyed slot 27 that receives the flattened keyed end 29 of a valve stem 31 which is positioned within bonnet 19. Since flat keying end 29 is keyed into ball slot 27, rotation of the stem 31 causes rotation of the ball 23.

A pair of end flanges 33, 34, which may be made of carbon steel, stainless steel, anodized aluminum, or other suitable material, are provided with flange 33 positioned at one end of body member 13 and flange 34 positioned at the other. End flanges 33 and 34 are connected together by support screws or bolts 35 that screw into support bars or spacers 37 so that the end flanges 33, 34 exert pressure on the mounting rings 21, 22 and the ball 23.

A coupling insert 39 is positioned around bonnet 19 and is provided with an upwardly and inwardly facing end on surface 41. An outwardly extending lip or bead 43 is formed on the upper end of bonnet 19 and lip 43 acts as a stop to limit upward movement of coupling insert 39. A resilient split ring 45, preferably made of nylon, is positioned between coupling insert 39 and the bonnet 19 and is provided with an upwardly and outwardly flaring flange 47 which is positioned between the upwardly facing end 41 of coupling insert 39 and lip 43 of bonnet 19.

A coupling cap 49 is positioned around the coupling insert 39, and is provided with interior threads 51 that thread into the exterior threads 53 for moving the cap 49 and coupling insert 39 toward and away from each other.

A collar 55 is formed on stem 31 and is provided with an upwardly facing shoulder 57 and a downwardly facing shoulder 59. An upwardly facing shoulder 61 is formed inside bonnet 19 for limiting the downward movement of the downwardly facing stem shoulder 59.

A downwardly facing shoulder 63 is formed within coupling cap 49, and the upwardly facing stem shoulder 57 limits the downward movement of coupling cap shoulder 63.

An upper resilient ring 65 of Teflon or the like is seated between downwardly facing coupling cap shoulder 63 and upwardly facing stem shoulder 57 and is kept from lateral expansion by cap interior sidewall 67.

A lower resilient ring 69 of Teflon or the like is seated between downwardly facing stem shoulder 59 and upwardly facing bonnet step or shoulder 61. The upper and lower surfaces of ring 69 have V-grooves 70 formed therein which provide a satisfactory seal, and do so using less pressure between cap 49 and insert 39 than would otherwise be necessary. The cap and insert may be threaded together by hand, without using a wrench, and still withstand rated pressures without leakage. Upper inside sidewall 71 of bonnet 19 prevents lateral expansion of lower ring 69 when it is subjected to the downward pressure of stem shoulder 59 as coupling cap 49 is threaded onto coupling insert 39.

Coupling insert 39 includes an inwardly-extending, upwardly-facing shoulder 73 which forms a seat for supporting the bottom of split ring 45.

The inner surface of bonnet lip 47, bonnet upper inside sidewall 71, flares outwardly and is bevelled for easier insertion of lower sealing ring 69 and stem collar 55 into bonnet 19.

A handle 75 fits over flattened top end 77 of stem 31 and is seated on stem step or shoulder 79. Handle 75 is held in place by a resilient handle retainer ring 81 which snaps into stem grooves 83 above the middle portion of the handle.

Handle 75 is provided with a stop arm 85 that permits 90° rotation of handle 75, stem 31, and ball 23, so that the ball 23 is rotatable from fully opened position as shown in FIG. 1, to fully closed wherein ball 23 is 90° from its FIG. 1 position. Stop screw nuts 87 are threaded into the top of end flanges 33, 34 and limit the rotation of handle 75 by contacting handle stop arm 85.

The flattened keyed end 29 of stem 31 is covered by a stem sleeve 89 which is preferably made of Teflon or the like.

End flanges 33, 34 have an annular recess 91 formed in their ball-facing surfaces. A resilient annular washer 93 is seated in flange recesses 91, and another resilient annular washer 95 is positioned against the outer surface of end flanges 33, 34. Flange gaskets 97 are provided having a cylindrical portion that covers the bore of flanges 33, 34, and flanged portions extending therefrom that cover washers 93 and 95.

In operation, handle 75 is turned to the position shown in FIG. 1 which is the fully opened position of the valve with fluid passageway 25 of glass ball 23 aligned with the bore of body member 13 and end flanges 33, 34. To close the valve, handle 75 is rotated 90° which causes fluid passageway 25 to assume a position at right angles to the bore of body member 13 and flanges 33, 34.

The glass ball valve constructed in accordance with this invention is provided with wetted parts which are inert to most chemicals and which do not contaminate the fluids flowing through the valve. These fluids are visible through the glass so that their flow may be observed. The glass ball valve of this invention is quickly and easily installed, provides full port, is highly resistant to thermal shock, is long lasting, opens and closes with a quarter turn of the handle, and is adaptable for use with pneumatic or electric operators.

Sealing ring 69 which provides a fluid seal between stem 31 and bonnet 19, upper ring 65 which provides a bearing surface for the downwardly facing alumina stem shoulder 59, stem sleeve 89, and flange gasket 97, as well as mounting rings 21, 22, are preferably made of TFE which is a synthetic resin such as is described in *Modern Plastics Encyclopedia* Vol. 47/No. 10A 1970–1971, McGraw Hill, Inc., New York, New York, pages 134–138. TFE resins currently available commercially are Teflon TFE by DuPont and Halon TFE by Allied Chemical Corp. Similar resins are marketed under the trademarks Kel-F, Teflon FEP, and Teflon 100. All of these resins are physically and chemically stable, solvent resistant, chemically inert, and capable of being resiliently deformed under pressure to form an unlubricated fluid seal with glass.

The word "glass" as used herein is defined as to include glass or a glass lining, or other essentially vitreous material or ceramic material or a composite of glass and ceramic.

Split ring 45 is preferably made of Nylon because of the well known strength of Nylon. Split ring 45 does not cold flow under pressure, and thus prevents the ball valve from leaking through the stem under high pressure.

The coupling 39, 49 provides evenly distributed pressure against the stem 31 so as to make it almost impossible to cock the stem 31 out of alignment with the center line of the bonnet 19.

It is to be understood that the forms of the invention herewith shown and described are to be taken as presently preferred embodiments. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

We claim:

1. A glass ball valve comprising a glass body member having a cylindrical sidewall forming a passageway, a cylindrical glass bonnet extending from the cylindrical sidewall of the body member, a pair of mounting rings forming a seat with one ring positioned inside the body member at each end thereof, a glass valve ball seated in said pair of mounting rings and having a fluid passageway therethrough, a stem positioned in said bonnet, means connecting one end of the stem to the ball so that rotation of the stem causes rotation of the ball, a pair of end flanges with one positioned at each end of the body member, means connecting the end flanges together and exerting pressure on the mounting rings and the ball, a coupling insert positioned around said bonnet and having an upwardly facing end, an outwardly extending lip formed on the upper end of the bonnet which acts as a stop to limit upward movement of said coupling insert, a resilient split ring positioned between the coupling insert and the bonnet and having an upwardly and outwardly flaring flange which is positioned between said upwardly facing end of the coupling insert and said lip of the bonnet, a coupling cap positioned around said coupling insert, means connecting the coupling cap to the coupling insert for moving them toward and away from each other, a collar formed on said stem with an upwardly facing shoulder and a downwardly facing shoulder, an upwardly facing shoulder formed inside the bonnet for limiting the downward movement of said downwardly facing stem shoulder, a downwardly facing shoulder formed in the coupling cap, said upwardly facing stem shoulder limiting the downward movement of said coupling cap shoulder, an upper resilient ring of Teflon or the like seated between said upwardly facing stem shoulder and said downwardly facing coupling cap shoulder, and a lower resilient ring of Teflon or the like seated between said downwardly facing stem shoulder and said upwardly facing bonnet shoulder for sealing between said stem and bonnet.

2. The glass ball valve of claim 1 including an inwardly-extending, upwardly-facing shoulder formed near the bottom of said coupling insert for supporting the bottom of said split ring.

3. The glass ball valve of claim 1 wherein the inner surface of said bonnet lip flares outwardly and is bevelled for easier insertion of said lower sealing ring and said stem collar into said bonnet.

4. The glass ball valve of claim 1 wherein said lower resilient ring is provided with upper and lower surfaces having V-grooves formed therein, whereby said lower resilient ring provides a satisfactory seal under relatively light pressure exerted by the coupling cap and insert.

* * * * *